June 1, 1937. H. S. INDGE 2,082,737
HONING APPARATUS
Filed Feb. 4, 1936
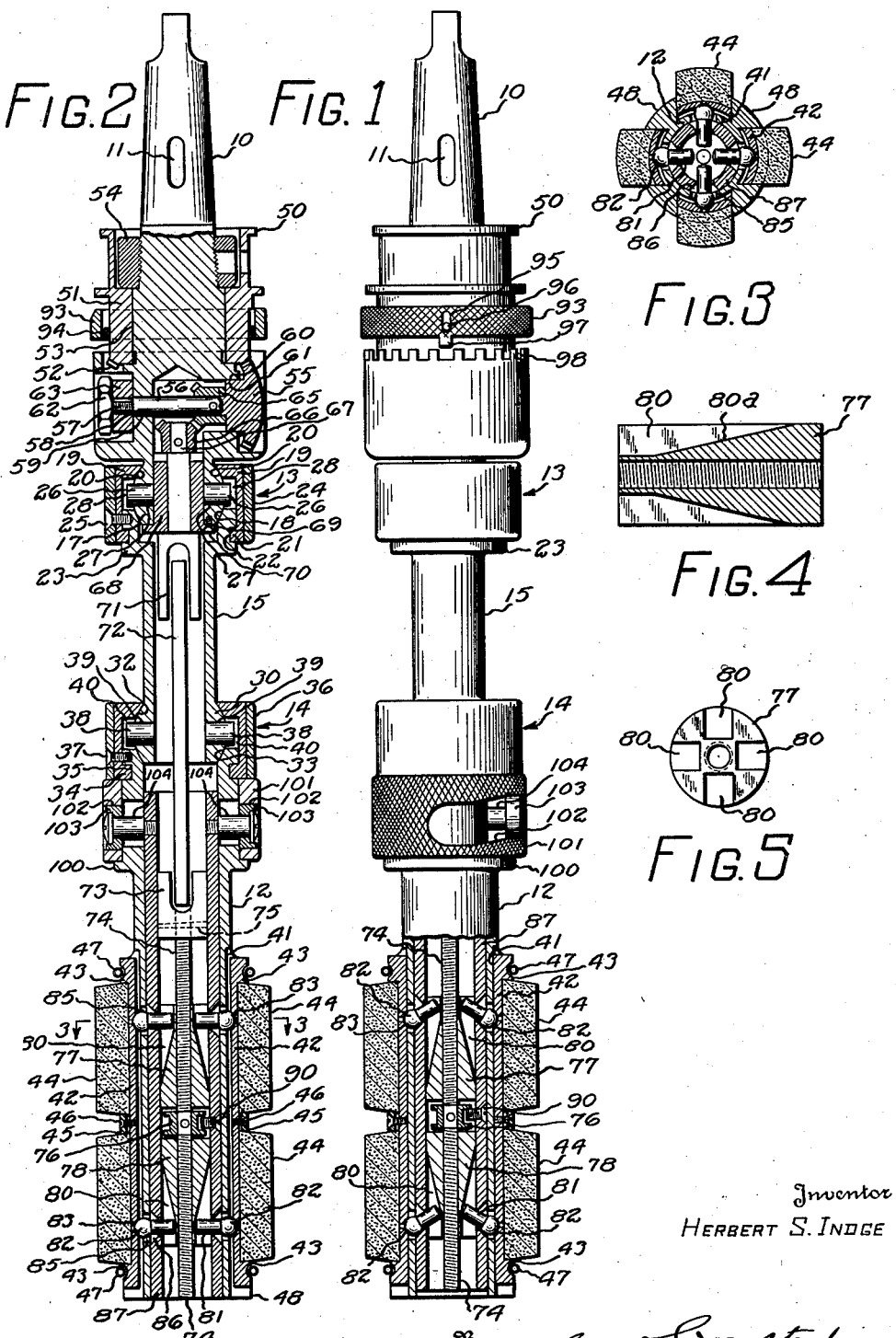
Inventor
HERBERT S. INDGE
By George Crompton Jr.
Attorney Patented June 1, 1937

2,082,737

UNITED STATES PATENT OFFICE 2,082,737

HONING APPARATUS

Herbert S. Indge, Westboro, Mass., assignor to Norton Company, Worcester, Mass., a corporation of Massachusetts Application February 4, 1936, Serial No. 62,315

4 Claims. (Cl. 51—184.3)

The invention relates to honing apparatus for the finishing of the bores of cylinders.

One object of the invention is to provide a honing apparatus capable of delicate adjustment. Another object of the invention is to provide a honing apparatus which shall hone the work piece to a given size. Another object of the invention is to provide a honing apparatus having a collapse control independent of the adjustment control. Another object of the invention is to provide a honing apparatus having a balanced adjustment device. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawing in which is shown one of many possible embodiments of the mechanical features of this invention, Fig. 1 is a front elevation of honing apparatus constructed in accordance with the invention, the lower part or head of the apparatus being shown in axial section;

Fig. 2 is a view similar to Fig. 1, the major portion of the apparatus, however, being shown in axial section, and the parts being shown in the position in which the shoes are thrust outwardly in working position;

Fig. 3 is a cross sectional view on the line 3—3 of Fig. 2;

Fig. 4 is an enlarged view in axial section of one of the operating cams;

Fig. 5 is an end elevation of the cam of Fig. 4.

Referring now to Figs. 1 and 2, I provide a spindle 10 having a conical surface as shown and of a size and shape to fit in a machine tool spindle in order to hold and rotate the hone. The entire hone may be mounted in the spindle of a suitable machine and the spindle 10 may be of any desired size and shape to fit in a given machine spindle. I provide an elongated slot 11 for locking the spindle 10 to the machine spindle by means of a wedge pin or the like.

Connected to the spindle 10 is a hone head sleeve 12 so that whenever the spindle 10 is revolved, the sleeve 12 is also revolved. The hone head, however, may align itself in the bore of the cylinder being honed, and is connected to the spindle 10 by two universal joints 13 and 14, and an interposed hollow shaft 15.

Considering now the construction of the upper universal joint 13 and still referring to Fig. 2, formed on the under side of the spindle 10 is a spherical portion 17 against the under side of which seats a partial spherical surface 18 formed on the upper end of the hollow shaft 15. A two-part collar 19 has a partial spherical surface 20 which engages the upper portion of the spherical end 17. The collar 19 has an annular inwardly extending flange 21 engaging a groove 22 formed on the periphery of an enlarged diameter portion 23 of the hollow shaft 15. By reason of the fact that the collar 19 is in two parts, this universal joint can be readily assembled, and when assembled the parts are locked together by means of an integral collar 24 which may be secured in position by means of a screw 25 extending through it and through the collar 19 and into the enlarged diameter portion 23.

A pair of pins 26 are located with a press fit in bores 27 in the spherical end 17, these bores being coaxial and located coaxial with a diameter of the spherical end 17 and furthermore being normal to the axis of the spindle 10. The ends of the pins 26 project beyond the spherical surface of the end 17 and into recesses 28 in the collars 19, the recesses being larger than the ends of the pins 26 to allow limited relative motion.

Thus the spindle 10 is connected to the hollow shaft 15 by means of a universal joint, and the construction of the universal joint 14 is similar to the construction of the universal joint 13, for example as follows.

The shaft 15 has a spherical lower end 30 surrounded by a two-part collar 32 with a spherical surface, and the upper end of the hone head sleeve 12 has a spherical surface 33, both of which spherical surfaces engage the spherical end 30. The collar 32 has an inwardly extending annular flange 34 located in a groove 35 in the periphery of the hone head sleeve 12, and the parts of the universal joint 14 are, after assembly, secured together by a surrounding integral collar 36 which is secured in position by means of a screw 37. Pins 38, 38 are located in bores 39, 39 normal to the axis of the shaft 15 and located along a diameter of the spherical end 30, and these pins 38 project into recesses 40 in the collars 32. Thus the hone head sleeve 12 is connected by a universal joint with the spindle 10.

The lower portion of the hone head sleeve 12 has a long cylindrical surface 41 upon which are mounted a plurality of hone carrying shoes 42. As shown in Fig. 3, there may be four of such hone carrying shoes 42 which are arcuate in shape and slightly spaced from each other around the cylindrical surface 41. The ends of the several hone carrying members 42 have at each end thereof, as better shown in Figs. 1 and 2, overhanging flanges 43 in order to grip hones 44 which are elongated and arcuate in cross section, as shown in the several views. For example, I may provide a pair of hones 44 for each hone carrying shoe 42, and the hones may be secured to the shoes by any suitable kind of cement and also by means of clamps or gibs 45 together with screws 46 as shown. Springs 47 extend around the shoes 42 fitting in grooves therein and hold the shoes and, therefore, the hones upon the cylindrical surface 41 of the hone head sleeve 12, but by reason of this construction the several hones 44 may be expanded relative to each other.

As shown in Figs. 2 and 3, outwardly extending positioning lugs 48, integral with the sleeve 12, are provided to drive the hones 44. These lugs 48 engage the shoes 42 at the bottom thereof, and corresponding driving lugs, not shown, are provided to engage the shoes 42 at the upper ends thereof.

Among the features of the invention are a control for adjustably expanding the hones 44, and a further control for expanding or collapsing the hones 44 but without destroying the adjustment, so that, at any time, the hones may be collapsed and the hone head removed from the cylinder being operated upon, then reintroduced and expanded to the previously adjusted amount without change in the adjustment or careful measure thereof; and furthermore, without manipulation of the hone collapsing mechanism, small adjustments in the expansion of the hones may be made at any time and particularly while the hone is actually rotating.

Considering now the adjustment of the hones 44, I provide a pulley 50 which has integral with it a journal sleeve 51 on the bottom of which is a bevel gear portion 52. Pulley and sleeve may be placed in position over the upper end of the spindle 10, and the journal portion fits on a cylindrical journal portion 53 of the spindle 10. The pulley 50 and associated parts may be secured in position by means of a nut 54 secured to a screw threaded part of the spindle 10.

Meshing with the bevel gear 52 is a bevel gear 55 having an integral stud extension 56 with a screw threaded end 57 and a shoulder 58. The stud 56 extends transversely to the axis of the spindle 10 and passes through a bearing portion 59 in the spindle 10; a larger bearing 60 coaxial with the bearing 59 journals a cylindrical portion 61 of bevel gear 55. A nut 62 and a collar 63 engaging the shoulder 58 secure the parts together.

Mounted upon and fastened to the stud portion 56 is a bevel gear member 65 which meshes with a bevel gear 66 secured to the top of a shaft 67. Shaft 67 is journaled in a bearing bushing 68 and has a flange 69 secured by means of a screw 70 to the spherical end 17. The shaft 67 has an integral fork portion 71 which is connected by means of a flat bar 72 with a similar fork 73 to which is fastened a screw 74 by means of pin 75. The screw 74 has screw threads of one hand from its upper end to a spool 76 and below the spool 76 the screw 74 has screw threads of the other hand.

Cam members 77 and 78 are mounted upon the screw 74 and have threaded bores fitting the threads of the screw. Except for the fact that the threads in the bores of the members 77 and 78 are of the opposite hand, they are identical and the shape thereof can be determined from a comparison of Figs. 1 and 2 with Fig. 5. Each cam member 77 and 78 has four inclined wedge grooves 80 in their otherwise cylindrical contours. Engaging each groove of each of the cam members 77 and 78 are pins 81 having spherical heads 82.

The spherical heads 82 of the pins 81 fit in recesses 83 in the shoes 42, there being two recesses in each shoe, and there being two pins 81 for each shoe, thus the mechanism has eight pins in all, a shank of a pin extending into each groove 80 against the inclined surface 80a thereof. The cylindrical heads 82 are also located in holes 85 provided in the wall of the hone head sleeve 12, and the shanks of the pins 81 extend through countersunk holes 86 provided in a hone collapsing operating sleeve 87.

Considering now the fine adjustment of the hones 44, if the pulley 50 is turned relative to the spindle 10, the bevel gears 52, 55, 65 and 66 will be turned which causes rotation of the upper fork 71, of the bar 72 which drives the fork 73, thus rotating the screw 74, and if the direction of rotation is such as to separate the cam members 77 and 78 the pins 81 will be moved outwardly by the cam surfaces 80a and at a uniform rate. The pins 81 are, during such operation, held in position in a vertical direction by the countersunk holes 86 which at the inner end thereof accurately position the pins 81. Conversely, movement in the other direction of the pulley 15 will cause the pins 81 to approach each other and thus adjust the several hones 44 inwardly. It will be seen that the hones 44 are maintained in parallelism by reason of the fact that the several cam surfaces 80a operate upon the pins 81 an equal amount, and the screw 74 is maintained in a given position axially of the head 12 by means of a screw 90 extending into the spool 76 which is fastened to the screw 74.

The direction of the threads on the screw 74 for each particular type of machine with which the honing apparatus is to be used is preferably such that when the spindle 10 is rotating and the pulley 50 is held, the hones 44 will be moved outwardly. Furthermore, I may provide a clamp, a brake or any other device fixed upon the machine frame to hold the pulley 50, and when so held assuming the spindle 10 is rotated, the hones 44 will be expanded. By operating such a clamp for a second or a fraction thereof, limited adjustments of the hones may be effected. Whether such a device is provided or not, the pulley 50 may readily be operated by the hand of the operator.

I further provide means for locking the adjustment apparatus just described in adjusted position once the adjustment has been made. Referring now to Figs. 1 and 2, upon the journal portion 51 there is mounted a collar 93 by means of an interposed friction washer 94. A slot 95 in the collar 93 together with a pin 96 in the slot, which pin extends into the journal portion 51, holds the collar 93 in position, allowing limited vertical movement. The collar 93 has a lug 97 adapted to fit in any one of castellated teeth 98 provided on the spindle 10. Thus the moving parts including the pulley 50 and everything driven thereby can be locked against rotation at any time desired, and also as easily unlocked merely by moving upwardly the collar 93.

Considering now the mechanism for collapsing the hone, which as aforesaid is independent of the mechanism for making fine adjustments thereof, the hone head sleeve 12 has an annular ridge 100 which supports a knurled collar 101 having a pair of cam slots 102 engaging rollers 103 on stud screws 104 which are secured to the sleeve 87. When the parts are in the position shown in Fig. 1, the rollers 103 are in the upper portion of the cam groove 102, and therefore the sleeve 87 is elevated. This holds the pins 81 in the rocked position illustrated in Fig. 1, and the hones 44 are collapsed. Rotation of the knurled collar 101 in a counterclockwise direction (looking down) places the rollers 103 in the lower part of the cam grooves 102, thus moving the rollers downwardly and, therefore, moving the sleeve 87 downwardly. This rocks the pins 81 to the normal position shown in Fig. 2, that is to say their axes are normal to the axis of the entire honing apparatus. Thus, by moving the knurled collar 101 clockwise at any time the hone can be collapsed and later it can be expanded without in any way changing the adjustment thereof.

The manner of using the honing apparatus of the invention will be readily understood from the description given. The spindle 10 is mounted in the hollow spindle of a machine which has not only a rotary but also in the usual case a reciprocatory motion. The honing head may be introduced into a cylinder to be honed in its collapsed condition, as shown in Fig. 1, and promptly expanded. Then the adjustment mechanism may be operated to give the desired pressure. This is a matter of feel and the operator can readily tell when the pressure is sufficient to remove a substantial amount of metal and produce a smooth bore. Although no resilient connections in the adjustment have been shown, the metal parts themselves are resilient to the extent needed for removal of a slight amount of metal to produce a finished surface. Whenever it is desired to inspect the surface or to remove the hone because the surface is finished, the hone can be readily collapsed as described. Fine adjustments of the apparatus to effect deeper cutting can be achieved while the hone is actually running simply by holding the pulley 50. As already explained, this can be done by making use of a clamp conveniently located on the machine, or it can be done by hand.

It will thus be seen that there has been provided by this invention an apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:—

1. In a machine tool hone, a sleeve, a plurality of hones mounted in parallel relation on the sleeve, pins passing through the sleeve and holding the hones apart, a second sleeve through which the sleeve passes, inclined plane means inside of both sleeves in position to operate upon the pins, and means to move one sleeve with respect to the other sleeve to collapse the hones.

2. In a machine tool hone, a sleeve, at least two elongated honing elements mounted on the outside of said sleeve and mounted for expansion and contraction relative to the axis of said sleeve, a second sleeve fitting within the first sleeve, at least four pins two of which, opposite each other, extend through holes in both sleeves and against the inside of the upper portion of two of the hones, and two more extending through holes in said sleeves and against the lower portion of the said two hones and located opposite each other, at least two pairs of wedge members, one wedge against the inner end of each pin, means to move all of the wedge members in unison to move the pins apart in unison thus to separate the honing elements, maintaining them parallel, and means to move one sleeve with relation to the other sleeve whereby to tilt the pins thus collapsing the honing elements.

3. In a machine tool hone, the combination with the parts, elements and features specified in claim 2, of a spindle, a universal joint connecting the sleeves to the spindle, a transmission in the universal joint to separate the wedges from the spindle through the transmission, and separate rotatable means to move one sleeve with relation to the other sleeve.

4. In a machine tool hone, a sleeve, a pair of hones mounted on said sleeve for expansion and contraction, pins holding said hones apart, a second sleeve, pins extending through both sleeves, a rotatable element on the first sleeve, cam means operated by said rotatable element, and connections between the cam means and the second sleeve whereby when the rotatable element is moved the cam means operates to move one sleeve relative to the other, tilting the pins and collapsing the hones.

HERBERT S. INDGE.